United States Patent
Ofuchi

(10) Patent No.: US 10,730,455 B1
(45) Date of Patent: Aug. 4, 2020

(54) WIRE HARNESS FOR SEATS

(71) Applicant: Yazaki Corporation, Tokyo (JP)

(72) Inventor: Kenichi Ofuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/706,611

(22) Filed: Dec. 6, 2019

(30) Foreign Application Priority Data

Jan. 10, 2019 (JP) ................................ 2019-002403

(51) Int. Cl.
*B60R 16/02* (2006.01)
*B60N 2/14* (2006.01)
*B60N 2/02* (2006.01)
*B60N 2/06* (2006.01)

(52) U.S. Cl.
CPC ........ *B60R 16/0215* (2013.01); *B60N 2/0224* (2013.01); *B60N 2/06* (2013.01); *B60N 2/14* (2013.01)

(58) Field of Classification Search
CPC ........ B60N 2/0224; B60N 2/045; B60N 2/14; B60R 16/0215; H01L 37/0045; H02G 3/08
See application file for complete search history.

(56) References Cited

U.S. PATENT DOCUMENTS

| | | | | |
|---|---|---|---|---|
| 4,885,513 A * | 12/1989 | Sakamoto | ................ | B60N 2/99 297/284.9 |
| 6,168,234 B1 * | 1/2001 | Haynes | ................ | B60N 2/143 297/344.21 |
| 6,267,430 B1 * | 7/2001 | Cresseaux | ............ | B60N 2/0224 296/65.13 |
| 2003/0184118 A1 * | 10/2003 | Sano | ......................... | B60J 5/06 296/155 |
| 2005/0189464 A1 * | 9/2005 | Link | ........................ | B60N 2/14 248/425 |
| 2006/0084293 A1 * | 4/2006 | Jeong | ....................... | B60N 2/06 439/76.2 |
| 2007/0284905 A1 * | 12/2007 | Bailey | .................. | B60N 2/0232 296/65.07 |
| 2010/0253123 A1 * | 10/2010 | DeCraene | .............. | B60N 2/062 297/344.22 |

(Continued)

FOREIGN PATENT DOCUMENTS

JP 2013-23069 A 2/2013

*Primary Examiner* — Timothy J Thompson
*Assistant Examiner* — Amol H Patel
(74) *Attorney, Agent, or Firm* — Kenealy Vaidya LLP

(57) ABSTRACT

A wire harness for seats includes: a relay device provided to a rotation shaft of a seat; a first wiring material having one end electrically connected with the relay device; a winding device installed on the vehicle floor side, and connected with the other end of the first wiring material so as to electrically connect the first wiring material with a power supply on the vehicle floor side, the winding device unwinding and winding the first wiring material along a sliding direction of the seat in association with slide movement of the seat along the sliding direction and rotation of the seat with the rotation shaft serving as a rotation center; and a second wiring material provided to the seat and having one end electrically connected with the first wiring material via the relay device and the other end electrically connected with electrical equipment provided to the seat.

2 Claims, 5 Drawing Sheets

(56) References Cited

U.S. PATENT DOCUMENTS

| | | | | |
|---|---|---|---|---|
| 2014/0051266 A1* | 2/2014 | Aikawa | ............... | B60R 16/027 |
| | | | | 439/13 |
| 2014/0051267 A1* | 2/2014 | Asakura | ............... | B60R 16/027 |
| | | | | 439/15 |
| 2015/0001327 A1* | 1/2015 | Hamada | ................ | B65H 75/48 |
| | | | | 242/376 |
| 2016/0013627 A1* | 1/2016 | Katsuramaki | .......... | H02G 11/02 |
| | | | | 242/377 |
| 2016/0059801 A1* | 3/2016 | Katsuramaki | ....... | B60R 16/0215 |
| | | | | 191/12.2 R |
| 2018/0241165 A1* | 8/2018 | Matsuo | ................. | H01R 35/04 |
| 2020/0079243 A1* | 3/2020 | Bork | ................... | B60N 2/0228 |

* cited by examiner

WIRE HARNESS FOR SEATS

CROSS-REFERENCE TO RELATED APPLICATION(S)

The present application claims priority to and incorporates by reference the entire contents of Japanese Patent Application No. 2019-002403 filed in Japan on Jan. 10, 2019.

BACKGROUND OF THE INVENTION

1. Field of the Invention

The present invention relates to a wire harness for seats.

2. Description of the Related Art

As conventional wire harnesses applied to vehicles, for example, Japanese Patent Application Laid-open No. 2013-023069 discloses a power supply device for slide seats that supplies power by electrically connecting the side of a body of a vehicle with the side of a slide seat slidably operable in a certain direction with respect to the body.

The power supply device for slide seats disclosed in the above-described Japanese Patent Application Laid-open No. 2013-023069 is desired to have a configuration that allows more variety of seat arrangements, for example.

SUMMARY OF THE INVENTION

The present invention has been made considering the above-described circumstances, and has an object of providing a wire harness for seats that can appropriately supply power to the seats.

In order to achieve the above mentioned object, a wire harness for seats according to one aspect of the present invention includes a relay device provided to a rotation shaft of a seat disposed on a vehicle floor; a first wiring material having one end electrically connected with the relay device; a winding device installed on the vehicle floor side, and connected with another end of the first wiring material so as to electrically connect the first wiring material with a power supply on the vehicle floor side, the winding device unwinding and winding the first wiring material along a sliding direction of the seat in association with slide movement of the seat along the sliding direction and rotation of the seat with the rotation shaft serving as a rotation center; and a second wiring material provided to the seat and having one end electrically connected with the first wiring material via the relay device and another end electrically connected with electrical equipment provided to the seat.

According to another aspect of the present invention, in the wire harness for seats, it is possible to further include a guide provided to an outer peripheral surface of the rotation shaft, the guide allowing the other end of the first wiring material to be wound along the rotating direction in association with rotation of the seat in a rotating direction with the rotation shaft serving as a rotation center.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will be described in detail with reference to the accompanying drawings. It should be noted that the present invention is not limited by this embodiment. Furthermore, components of the embodiment described below include a component that is replaceable and easily thought of by the skilled person or substantially the same component.

Figure 1:
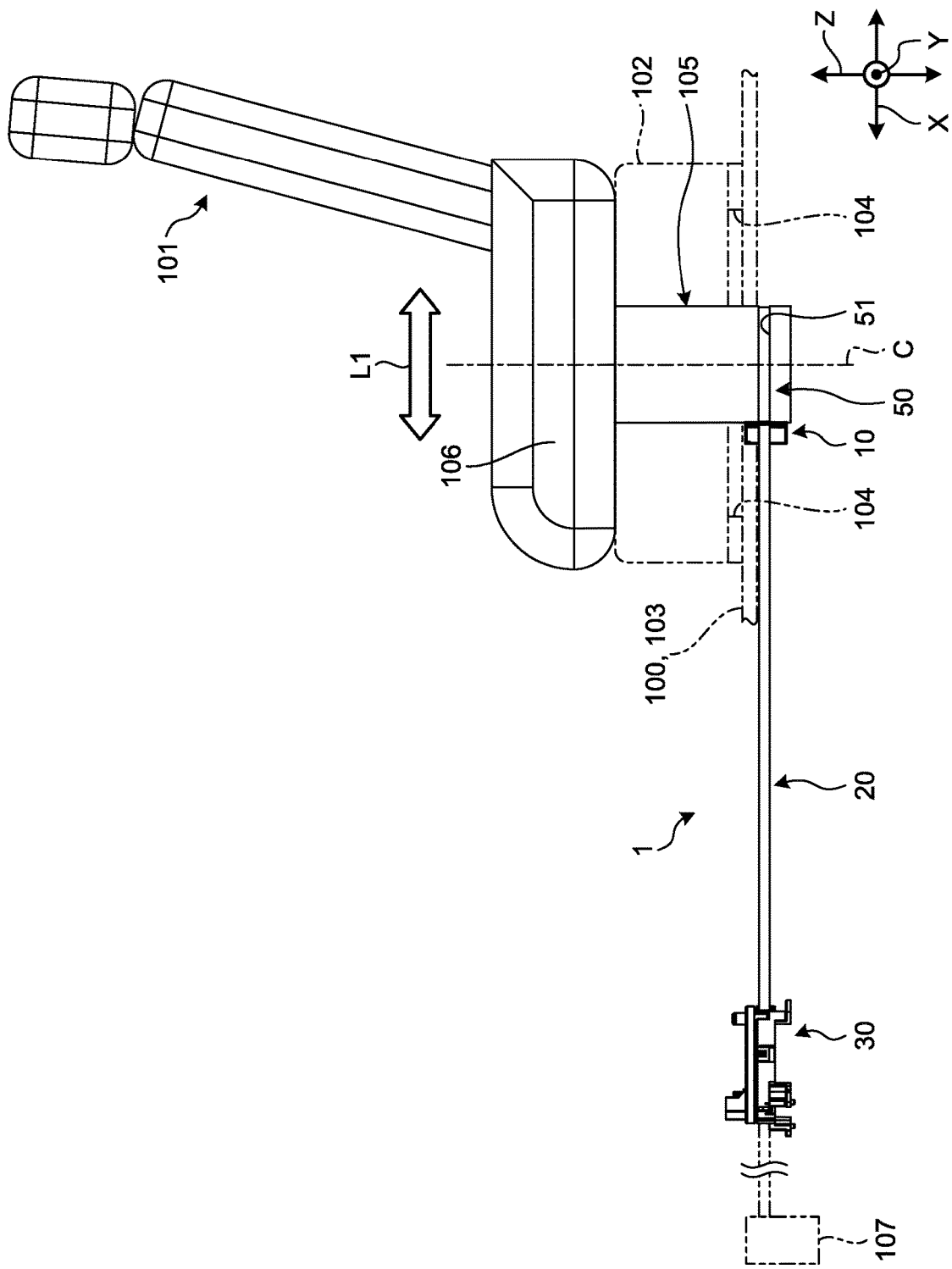
FIG. 1 is a schematic side view schematically illustrating a configuration of a seat to which a wire harness for seats according to an embodiment is applied.
Figure 2:
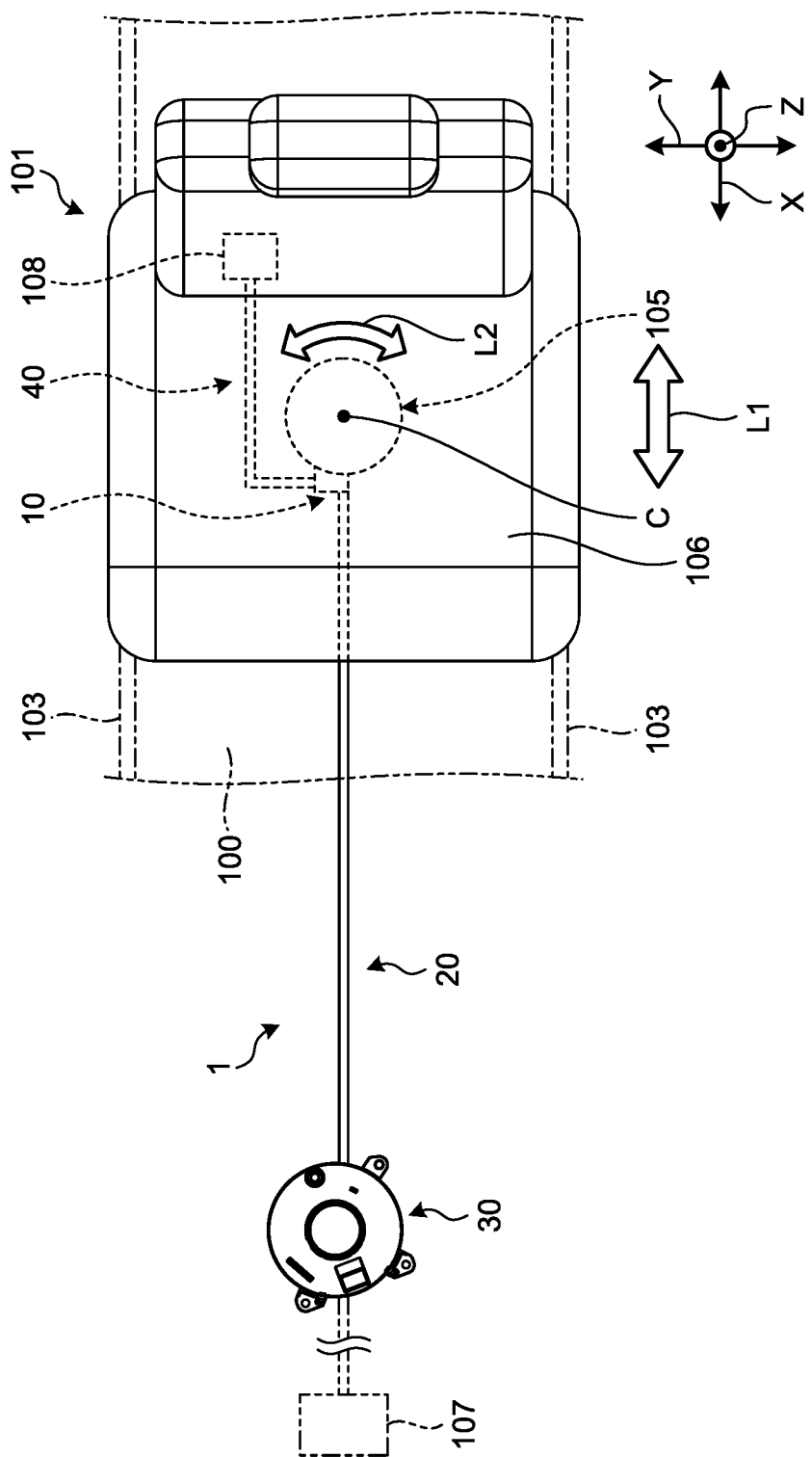
FIG. 2 is a schematic plan view schematically illustrating the configuration of the seat to which the wire harness for seats according to the embodiment is applied.
Figure 5:
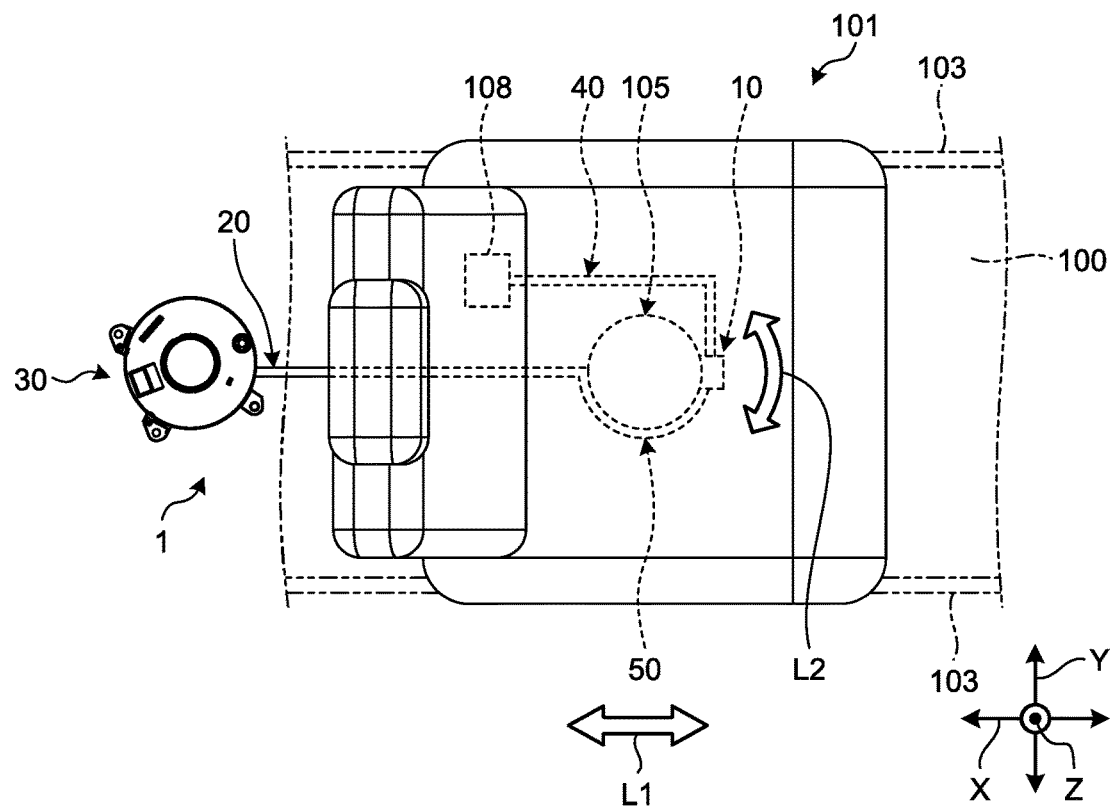
FIG. 5 is a schematic plan view illustrating the example of the operation of the seat to which the wire harness for seats according to the embodiment is applied.

FIGS. 1, 2, and 5, which will be explained later, illustrate only part of a vehicle floor with alternate long and two short dashes line by omitting details. In the other drawings, illustrating the vehicle floor is entirely omitted. FIG. 1 is a diagram illustrating a seat base with alternate long and two short dashes line by omitting details. In the other drawings, illustrating the seat base is entirely omitted. FIGS. 2 and 5 illustrate only part of a seat rail with alternate long and two short dashes line by omitting details. In the other drawings, illustrating the seat rail is entirely omitted. Moreover, each drawing omits parts of the seat other than important parts, as appropriate. In the description hereinafter, for a first direction, a second direction, and a third direction that intersect one another, the first direction is referred to as "a front-back direction X", the second direction as "a width direction Y", and the third direction as "a height direction Z". The front-back direction X, the width direction Y, and the height direction Z orthogonally intersect one another. Typically, in a state in which a wire harness for seats is mounted in a vehicle and the vehicle is positioned on a horizontal plane, the front-back direction X and the width direction Y are along a horizontal direction, and the height direction Z is along a vertical direction. The front-back direction X typically corresponds to a longitudinal direction of the vehicle into which the wire harness for seats is mounted, and in the embodiment, corresponds to a sliding direction of the seat. The width direction Y typically corresponds to the vehicle-width direction of the vehicle into which the wire harness for seats is mounted. The height direction Z typically corresponds to the vehicle-height direction of the vehicle into which the wire harness for seats is mounted. The directions to be used hereinafter represent directions in which the parts of the vehicle are assembled one another, unless otherwise specified.

Embodiment

Figure 3:
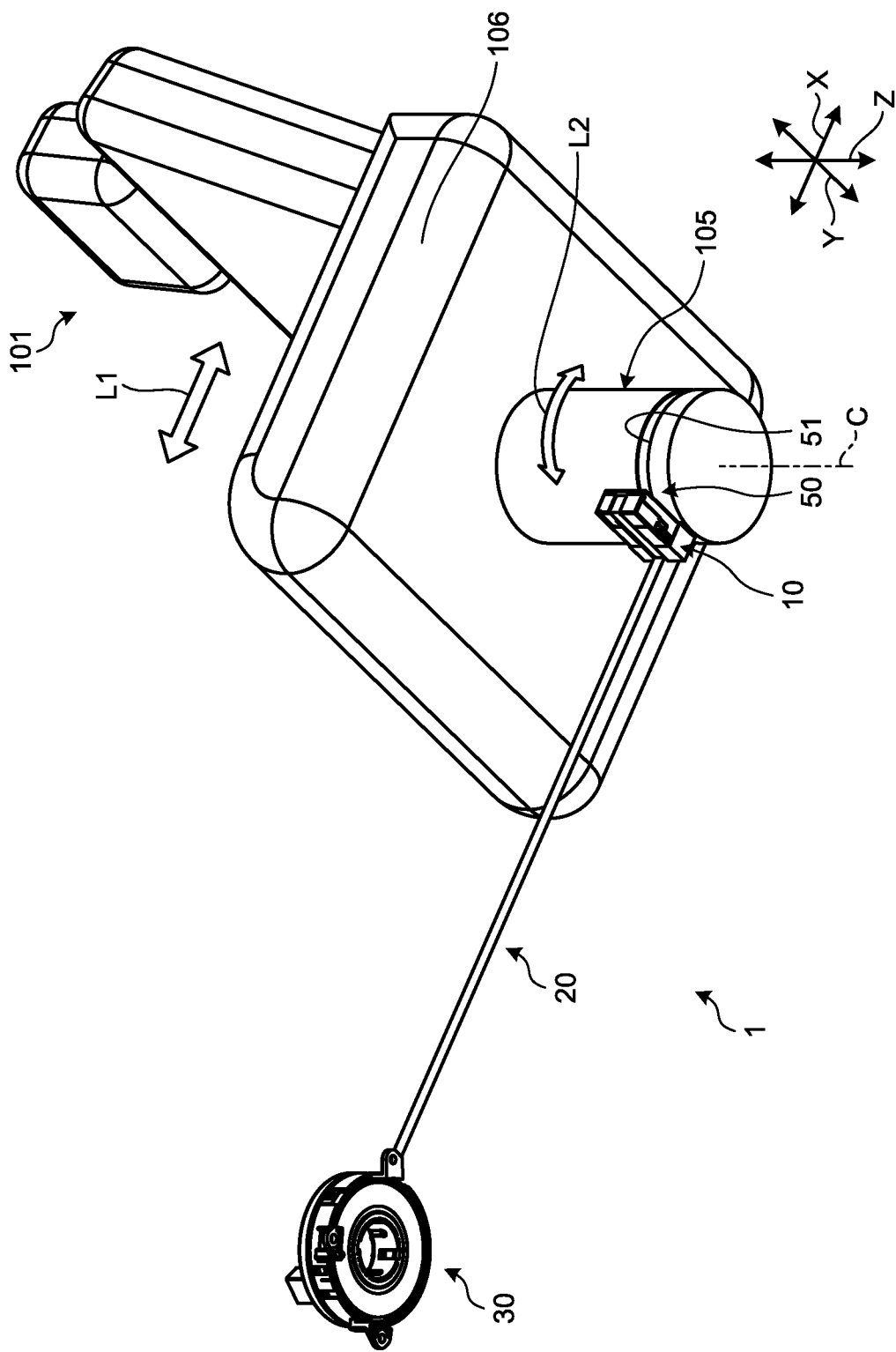
FIG. 3 is a schematic perspective view schematically illustrating the configuration of the seat to which the wire harness for seats according to the embodiment is applied.

A wire harness 1 for seats of the present embodiment illustrated in FIGS. 1, 2, and 3 constitutes a part of an onboard power supply system that supplies electric power to a seat 101 disposed on a vehicle floor 100 that constitutes a floor surface of a vehicle.

The seat 101 is a seat on which an occupant of the vehicle is seated, and is disposed on the vehicle floor 100 so as to be slidably movable along a sliding direction L1. The sliding direction L1 of the seat 101 of the present embodiment is a direction along the front-back direction X. The seat 101 is supported by a seat rail 103 provided to the vehicle floor 100 with the seat base 102 interposed therebetween. The seat base 102 is a base positioned in a lower side of the seat 101 in the height direction Z to support the seat 101. The seat base 102 has a plurality of sliders 104 provided on the lower surface thereof in the height direction Z. The seat rail 103 is a guide rail with which the seat 101 is guided while being slidably moved along the front-back direction X. The seat rail 103 is provided to the vehicle floor 100, in an extending manner in the front-back direction X. A pair of the seat rails 103 are provided by being spaced apart from each other along the width direction Y. Each seat rail 103 has a slider 104 engaged therewith, and guides the slider 104 along the sliding direction L1 (front-back direction X). With this configuration, the seat 101 is supported by the corresponding seat rail 103 with the seat base 102 and the slider 104 interposed therebetween, so as to be slidably movable on the seat rail 103 along the sliding direction L1. The seat 101 may be electrically slidably movable or may be manually slidably movable.

Figure 4:
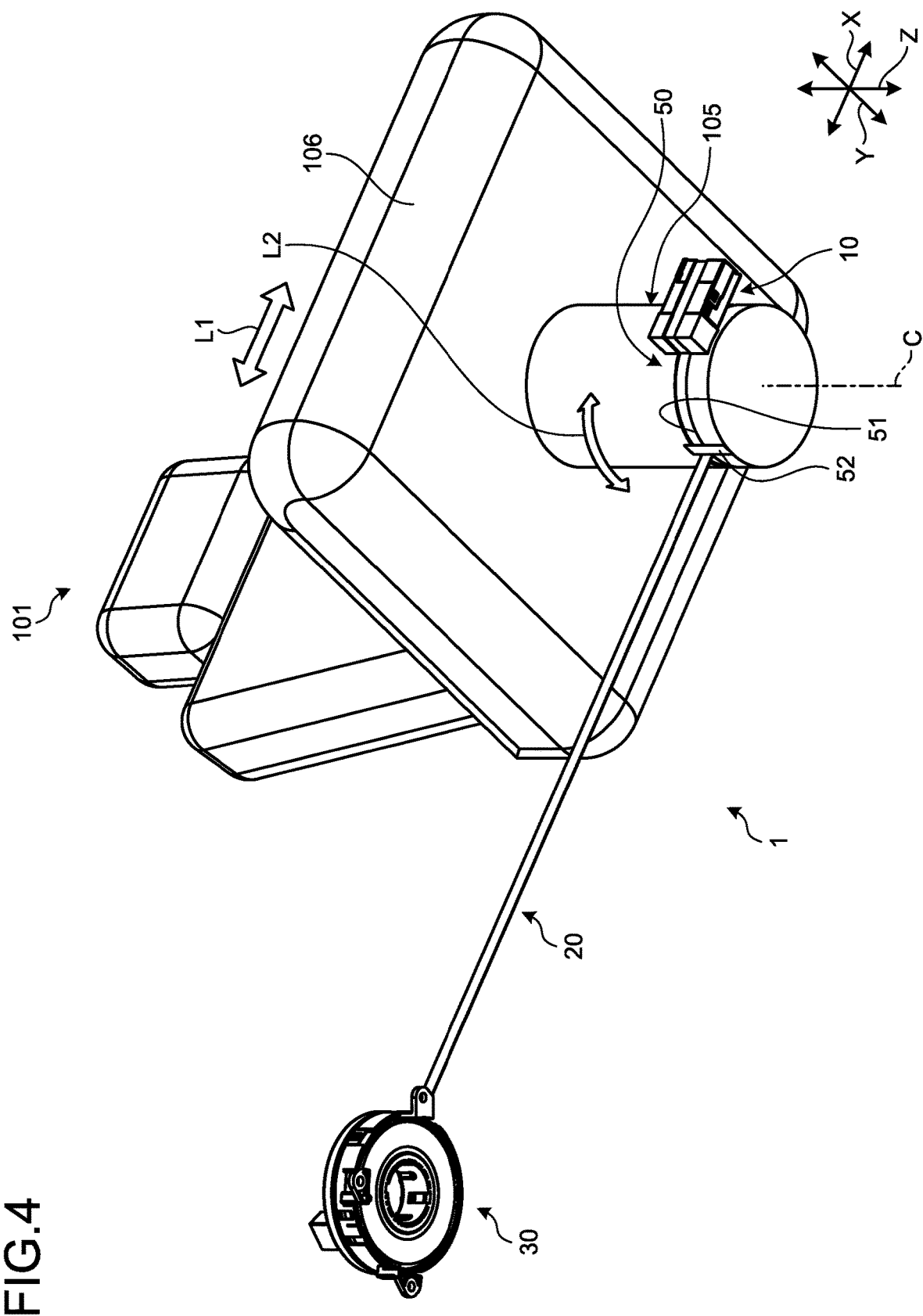
FIG. 4 is a schematic perspective view illustrating an example of an operation of the seat to which the wire harness for seats according to the embodiment is applied.

Furthermore, the seat 101 of the present embodiment includes a rotation shaft 105, so as to be rotatable in a rotating direction L2 around the rotation shaft 105. The rotation shaft 105 is provided to a seat surface 106 included in the seat 101, onto which an occupant is seated. The rotation shaft 105 is formed so as to protrude from a bottom surface of the seat surface 106 in the height direction Z, facing downward in the height direction Z. The rotation shaft 105 is formed substantially in a cylindrical shape with the central axis C being along the height direction Z. The rotation shaft 105 is supported by the seat base 102 around the central axis C in a rotatable manner. With this configuration, the seat 101 is rotatable with any desired angle in the rotating direction L2 around the central axis C of the rotation shaft 105. For example, FIG. 4 illustrates a state in which the seat 101 is rotated by 90° with respect to the reference position indicated in FIG. 2. FIG. 5 illustrates a state in which the seat 101 is rotated by 180° with respect to the reference position indicated in FIG. 2. The seat 101 may be electrically rotatable or may be manually rotatable.

The wire harness 1 for seats supplies power to the seat 101 disposed on the vehicle floor 100, as described above, so as to be slidably movable along the sliding direction L1 and rotatable in the rotating direction L2.

Specifically, the wire harness 1 for seats includes a relay device 10, a first wiring material 20, a winding device 30, and a second wiring material 40.

The relay device 10 is a device that relays the first wiring material 20 and the second wiring material 40, in a power feeding line that electrically connects a power supply 107 on the vehicle floor 100 side with electrical equipment 108 provided to the seat 101. The power supply 107 is mounted on a vehicle and serves as a source of supplying power. The power supply 107 is constituted of a power generator that generates electric power, a power storage device that stores therein electric power, and the like, for example. The power supply 107 is installed on the vehicle floor 100 side, and is configured so as not to move together with the seat 101. In contrast, the electrical equipment 108 is an electronic device that operates with electric power supplied by the power supply 107. The electrical equipment 108 is constituted of various actuators such as a heater that warms the seat surface 106 and an electric motor that drives various parts, various sensors that detect load and the like, and various switches or the like that receive operation input, for example. The electrical equipment 108 is provided to the seat 101 so as to be movable together with the seat 101. The power supply 107 and the electrical equipment 108 are positioned so as to relatively move in association with the slide movement and the rotation of the seat 101. The power feeding line including the relay device 10 supplies electric power between the power supply 107 and the electrical equipment 108.

The relay device 10 is provided to the rotation shaft 105 of the seat 101. The relay device 10 is installed on the outer peripheral surface of the lower end of the rotation shaft 105 in the height direction Z. With this configuration, the relay device 10 is slidably movable together with the seat 101 along the sliding direction L1, and is integrally rotatable together with the seat 101 in the rotating direction L2. The respective ends of the first wiring material 20 and the second wiring material 40 are connected to the relay device 10, so that the relay device 10 relays electrical continuity between the first wiring material 20 and the second wiring material 40. The relay device 10 may be constituted of various types of known connectors, for example.

The first wiring material 20, which has electrical conductivity, is a wiring material that constitutes part of the power feeding line that electrically connects the power supply 107 on the vehicle floor 100 side with the electrical equipment 108 provided to the seat 101. The first wiring material 20 is laid in a space part on the lower side of the vehicle floor 100 (what is called under the floor) in the height direction Z. The first wiring material 20 is constituted of, for example, an electrical wire including a plurality of conductors (core wires) each having electrical conductivity the exterior of which is covered with an insulating cover. The first wiring material 20 is constituted of, for example, a flat cable (flexible flat cable (FFC)) formed in a long flat-strip shape. The first wiring material 20 extends in the front-back direction X. The first wiring material 20 has one end that is electrically connected with the relay device 10 in the front-back direction X. The first wiring material 20 has a connector provided to the one end thereof, for example, in the front-back direction X, and is electrically connected with the relay device 10 via the connector. With this configuration, in the first wiring material 20, the one end thereof in the front-back direction X is slidably movable together with the relay device 10 along the sliding direction L1 in association with the slide movement and the rotation of the seat 101, and is integrally rotatable together with the seat 101 in the rotating direction L2. The first wiring material 20 has the other end that is connected with the winding device 30 in the front-back direction X.

The winding device 30 is a device that stores therein an excess length of the first wiring material 20 in association with the slide movement and the rotation of the seat 101. The winding device 30 of the present embodiment is installed on the vehicle floor 100 side, and is configured so as not to move together with the seat 101. The winding device 30 is disposed in the space part on the lower side of the vehicle floor 100 in the height direction Z (what is called under the floor). The winding device 30 is electrically connected with the power supply 107 via a connector and electrical equipment. The winding device 30 is connected with the other end of the first wiring material 20 in the front-back direction X, as described above. With this configuration, the other end of the first wiring material 20 connected with the winding device 30 also does not move together with the seat 101. The winding device 30 electrically connects the first wiring material 20 to the power supply 107 on the vehicle floor 100 side. The winding device 30 relays electrical continuity between the first wiring material 20 and other electrical equipment on the power supply 107 side. Furthermore, the winding device 30 unwinds and winds the first wiring material 20 along the sliding direction L1, in association with slide movement of the seat 101 along the sliding direction L1 and rotation of the seat 101 with the rotation shaft 105 serving as a rotation center. The winding device 30 unwinds and winds the first wiring material 20, by being synchronized with the slide movement and the rotation of the seat 101. The first wiring material 20 functions as what is called a spiral cable by being unwound and wound by the winding device 30. The winding device 30 is constituted of various known structures, including a return spring or the like that adds energizing force to a winding side of the first wiring material 20 unwound from the winding device 30, for example.

More specifically, the winding device 30 unwinds and winds the first wiring material 20 along the sliding direction L1 (front-back direction X) in association with the rotation of the seat 101. That is, when the seat 101 rotates to one side of the rotating direction L2 (see FIGS. 4 and 5, for example) from a predetermined reference position (see FIGS. 2 and 3, for example), the winding device 30 unwinds the first wiring material 20 along the sliding direction L1. In contrast, when the seat 101 rotates so as to return to the reference position (see FIGS. 2 and 3, for example) from a state in which the seat 101 is rotated to the one side in the rotating direction L2 (see FIGS. 4 and 5, for example), the winding device 30 winds the first wiring material 20 along the sliding direction L1.

Furthermore, the winding device 30 unwinds and winds the first wiring material 20 along the sliding direction L1 (front-back direction X) in association with the slide movement of the seat 101. That is, when the seat 101 slidably moves to a side in which the seat 101 is approaching the winding device 30 along the sliding direction L1 (front-back direction X) (for example, moves to a position indicated in FIG. 5 from a position indicated in FIGS. 2 and 3), the winding device 30 winds the first wiring material 20 along the sliding direction L1. In contrast, when the seat 101 slidably moves to a side in which the seat 101 is separating from the winding device 30 along the sliding direction L1 (front-back direction X) (for example, moves from a position indicated in FIG. 5 to a position indicated in FIGS. 2 and 3), the winding device 30 unwinds the first wiring material 20 along the sliding direction L1.

The second wiring material 40, which has electrical conductivity, is a wiring material that constitutes part of the power feeding line that electrically connects the power supply 107 on the vehicle floor 100 side with the electrical equipment 108 provided to the seat 101. The second wiring material 40 is provided to the seat 101 and laid inside the seat 101. The second wiring material 40 is constituted of, similarly to the first wiring material 20, an electrical wire including a plurality of conductors (core wires) each having electrical conductivity the exterior of which is covered with an insulating cover, for example. The second wiring material 40 may be constituted of a flat cable (FFC), similarly to the first wiring material 20, and may be constituted of a regular electric wire. The second wiring material 40 has one end that is electrically connected with the first wiring material 20 via the relay device 10. The second wiring material 40 has a connector provided to the one end thereof, for example, and is connected with the relay device 10 via the connector, so as to be electrically connected with the first wiring material 20 via the relay device 10. Moreover, the second wiring material 40 has the other end that is electrically connected with the electrical equipment 108 provided to the seat 101. The second wiring material 40 has an excess length that is invariable regardless of the slide movement and the rotation of the seat 101. It should be noted that the number of pairs of the second wiring material 40 connected with the relay device 10 and the electrical equipment 108 is not limited to one, and may be two or more. That is, a plurality of the second wiring materials 40 may be connected with the relay device 10. In this case, the relay device 10 may also serve as a power distributor that distributes electric power to a plurality of pieces of the electrical equipment 108 via the second wiring materials 40.

Figure 6:
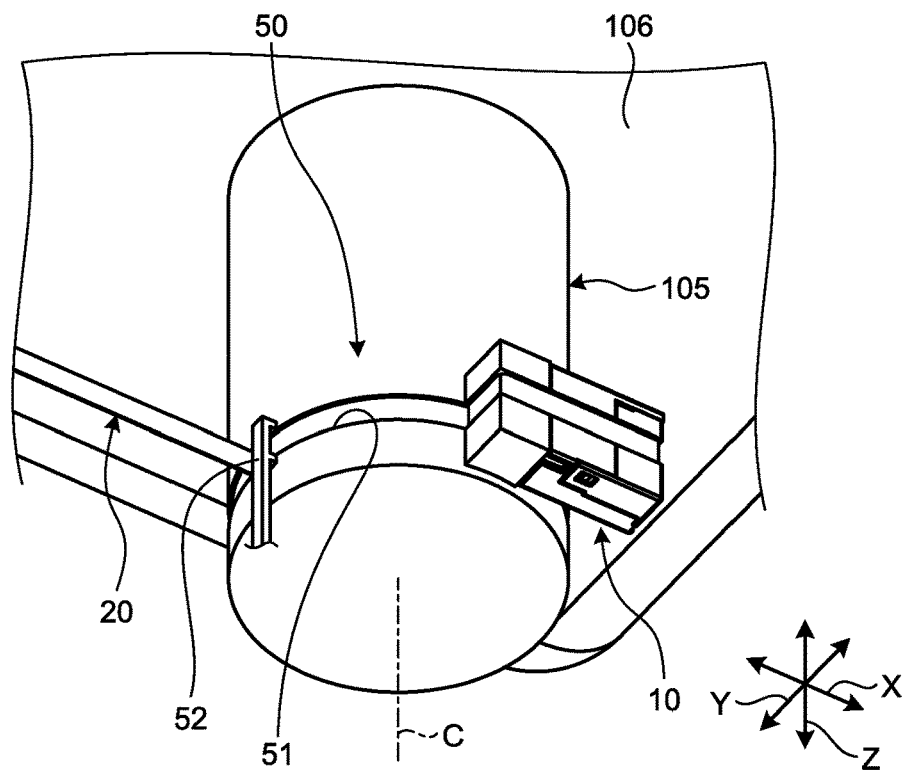
FIG. 6 is a partial perspective view including a guide of the wire harness for seats according to the embodiment.

Furthermore, the wire harness 1 for seats of the present embodiment includes, as illustrated in FIGS. 3, 4, and 6, a guide 50 that guides an end of the first wiring material 20 on the relay device 10 side as the seat 101 rotates.

The guide 50 is a part that is provided to an outer peripheral surface of the rotation shaft 105, and allows an end of the first wiring material 20 on the relay device 10 side to be wound along the rotating direction L2, as the seat 101 rotates in the rotating direction L2 with the rotation shaft 105 serving as the rotation center. Specifically, the guide 50 includes a groove 51 and a bending point holder 52.

The groove 51 is a groove formed on the outer peripheral surface of the rotation shaft 105. The groove 51 is annularly formed on the outer peripheral surface of the rotation shaft 105 along the circumferential direction. The groove 51 can accommodate and position the first wiring material 20 by allowing the first wiring material 20 to be wound around the outer peripheral surface of the rotation shaft 105 along the rotating direction L2. The above-described relay device 10 is disposed so as to be laid across the groove 51.

The bending point holder 52 is a part with which a bending point of the first wiring material 20 is formed in a certain position on the outer peripheral surface of the rotation shaft 105 and by which the bending point is held. The bending point holder 52 is slidably movable together with the seat 101 along the sliding direction L1, but is not rotatable together with the rotation shaft 105 of the seat 101. The bending point holder 52 is disposed in a certain position on the outer peripheral surface of the rotation shaft 105, the certain position facing the groove 51. The bending point holder 52 is, for example, assembled into a member such as the slider 104, for example, the member being slidably movable together with the seat 101 along the sliding direction L1, and being not rotatable together with the rotation shaft 105 of the seat 101. The bending point holder 52 holds part of the first wiring material 20 wound around and accommodated inside the groove 51 at a certain position, against the outer peripheral surface of the rotation shaft 105. Then, the bending point holder 52 forms a bending point of the first wiring material 20 between a part of the first wiring material 20 proceeding toward the relay device 10 side along the outer peripheral surface of the rotation shaft 105 and a part of the first wiring material 20 proceeding toward the winding device 30 side along the sliding direction L1.

The thus configured guide 50 allows the groove 51 and the bending point holder 52 to wind and hold the end of the first wiring material 20 on the relay device 10 side around the outer peripheral surface of the rotation shaft 105, in association with the rotation of the seat 101 in the rotating direction L2. That is, when a seat 101 rotates in the rotating direction L2, the first wiring material 20 slides to form a bending point at the bending point holder 52 as the seat 101 rotates, and a part of the first wiring material 20 on the relay device 10 side with respect to the bending point is wound around and accommodated inside the groove 51 so as to be held therein.

The above-described wire harness 1 for seats electrically connects the power supply 107 on the vehicle floor 100 side with the electrical equipment 108 provided to the seat 101, by use of the winding device 30, the first wiring material 20, the relay device 10, and the second wiring material 40 interposed therebetween, so as to supply power from the power supply 107 to the electrical equipment 108. In this case, as the seat 101 slidably moves and rotates, the winding device 30 unwinds and winds the first wiring material 20 along the sliding direction L1. With this configuration, the winding device 30 can appropriately store therein, in accordance with the slide position and the rotation position of the seat 101, an excess length of the first wiring material 20 with the first wiring material 20 being tensed. As a result, as illustrated in FIG. 6, for example, the wire harness 1 for seats can appropriately supply power without intermission to the seat 101 provided with various seat arrangements made by the slide movement and the rotation. Furthermore, the wire harness 1 for seats allows the winding device 30 to store therein an excess length of the first wiring material 20, so as to prevent, for example, the occurrence of abnormal noise due to flapping of the first wiring material 20.

The above-described wire harness 1 for seats allows the guide 50 to wind and hold the end of the first wiring material 20 on the relay device 10 side around the outer peripheral surface of the rotation shaft 105, as the seat 101 rotates, so as to appropriately treat the excess length of the first wiring material 20 on the relay device 10 side. As a result, the wire harness 1 for seats can more appropriately supply power to the seat 101. The guide 50 allows the groove 51 and the bending point holder 52 to form and hold a bending point at a certain position of the first wiring material 20, so as to hold, along the sliding direction L1, unwinding and winding directions of the first wiring material 20 with respect to the winding device 30.

It should be noted that the above-described wire harness for seats according to the embodiment of the present invention is not limited to the above-described embodiment, and can be changed in various manners within the scope recited in claims.

While, in the foregoing description, the sliding direction L1 of the seat 101 is a direction along the front-back direction X, the direction is not limited thereto, and may be a direction along the width direction Y.

While, in the foregoing description, the first wiring material 20 is a wiring material including a flat cable (FFC), the wiring material is not limited thereto, and may include a regular electric wire.

A wire harness for seats according to the embodiment electrically connects a power supply in a vehicle floor side with electrical equipment provided to a seat, by use of a winding device, a first wiring material, a relay device, and a second wiring material interposed therebetween, so as to supply power from the power supply to the electrical equipment. In this case, the winding device unwinds and winds, in association with the slide movement and the rotation of the seat, the first wiring material along the sliding direction. With this configuration, the winding device can appropriately store therein an excess length of the first wiring material in accordance with a slide position of the seat and a rotation position thereof. As a result, the wire harness for seats exerts the effect of appropriately supplying power to the seat.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness for seats comprising:
   a relay device provided to a rotation shaft of a seat disposed on a vehicle floor;
   a first wiring material having one end electrically connected with the relay device;
   a winding device installed on the vehicle floor side, and connected with another end of the first wiring material so as to electrically connect the first wiring material with a power supply on the vehicle floor side, the winding device unwinding and winding the first wiring material along a sliding direction of the seat in association with slide movement of the seat along the sliding direction and rotation of the seat with the rotation shaft serving as a rotation center; and
   a second wiring material provided to the seat and having one end electrically connected with the first wiring material via the relay device and another end electrically connected with electrical equipment provided to the seat.

2. The wire harness for seats according to claim 1, further comprising:
   a guide provided to an outer peripheral surface of the rotation shaft, the guide allowing the other end of the first wiring material to be wound along the rotating direction in association with rotation of the seat in a rotating direction with the rotation shaft serving as a rotation center.

* * * * *